United States Patent
Suumaki et al.

(10) Patent No.: US 9,351,322 B2
(45) Date of Patent: May 24, 2016

(54) WIRELESS COMMUNICATION LINK ESTABLISHMENT

(75) Inventors: Jan Suumaki, Lempaala (FI); Andrea Bacioccola, Helsinki (FI); James Steele, Cottenham (GB)

(73) Assignee: Nokia Technologies Oy, Espoo (FI)

( * ) Notice: Subject to any disclaimer, the term of this patent is extended or adjusted under 35 U.S.C. 154(b) by 366 days.

(21) Appl. No.: 13/822,399

(22) PCT Filed: Sep. 24, 2010

(86) PCT No.: PCT/FI2010/050738
§ 371 (c)(1),
(2), (4) Date: May 28, 2013

(87) PCT Pub. No.: WO2012/038581
PCT Pub. Date: Mar. 29, 2012

(65) Prior Publication Data
US 2013/0237270 A1    Sep. 12, 2013

(51) Int. Cl.
| | |
|---|---|
| *H04B 7/00* | (2006.01) |
| *H04W 76/02* | (2009.01) |
| *H04M 1/725* | (2006.01) |
| *H04W 4/00* | (2009.01) |

(52) U.S. Cl.
CPC .......... *H04W 76/021* (2013.01); *H04M 1/7253* (2013.01); *H04W 4/008* (2013.01); *H04W 76/02* (2013.01)

(58) Field of Classification Search
CPC .................................................... H04W 84/12
See application file for complete search history.

(56) References Cited

U.S. PATENT DOCUMENTS

| | | | | |
|---|---|---|---|---|
| 2004/0054885 A1* | 3/2004 | Bartram | .............. | H04L 63/0823 713/152 |
| 2005/0117605 A1* | 6/2005 | Yan | .................... | H04L 29/06027 370/469 |
| 2007/0054616 A1* | 3/2007 | Culbert | ............... | H04L 63/0492 455/41.1 |
| 2008/0198819 A1* | 8/2008 | Brown | .................. | H04W 84/18 370/338 |
| 2008/0311852 A1* | 12/2008 | Hansen | ................. | H04W 88/06 455/41.2 |

(Continued)

FOREIGN PATENT DOCUMENTS

| | | |
|---|---|---|
| EP | 1551140 | 9/2007 |
| WO | WO2006064480 | 6/2006 |

(Continued)

OTHER PUBLICATIONS

International Search Report of International Application No. PCT/FI2010/050738—Date of Completion of Search: Jun. 10, 2011, 3 pages.

*Primary Examiner* — Edward Urban
*Assistant Examiner* — Mohammed Rachedine
(74) *Attorney, Agent, or Firm* — Locke Lord LLP

(57) ABSTRACT

In accordance with an example embodiment of the present invention, an apparatus, a computer program product and a method is provided for establishment of a wireless communication link through machine reading. The example embodiment comprises receiving at least information identifying a wireless communication device through machine reading a machine-readable object, and initiating a wireless communication link establishment with the wireless communication device using the received information, wherein the wireless communication link establishment is incorporated with an indication that a machine-readable object associated with the wireless communication device was read.

17 Claims, 5 Drawing Sheets

(56) References Cited

U.S. PATENT DOCUMENTS

2009/0017783 A1* 1/2009 Li .................. H04W 52/325 455/296
2011/0252238 A1* 10/2011 Abuan ............... H04L 61/2575 713/168

FOREIGN PATENT DOCUMENTS

| WO | WO2007001629 | 1/2007 |
| WO | WO2009065626 | 5/2009 |

* cited by examiner

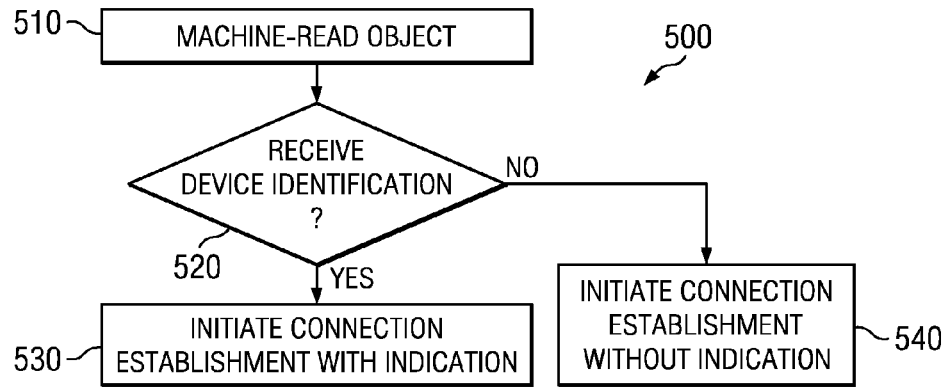
FIG. 5
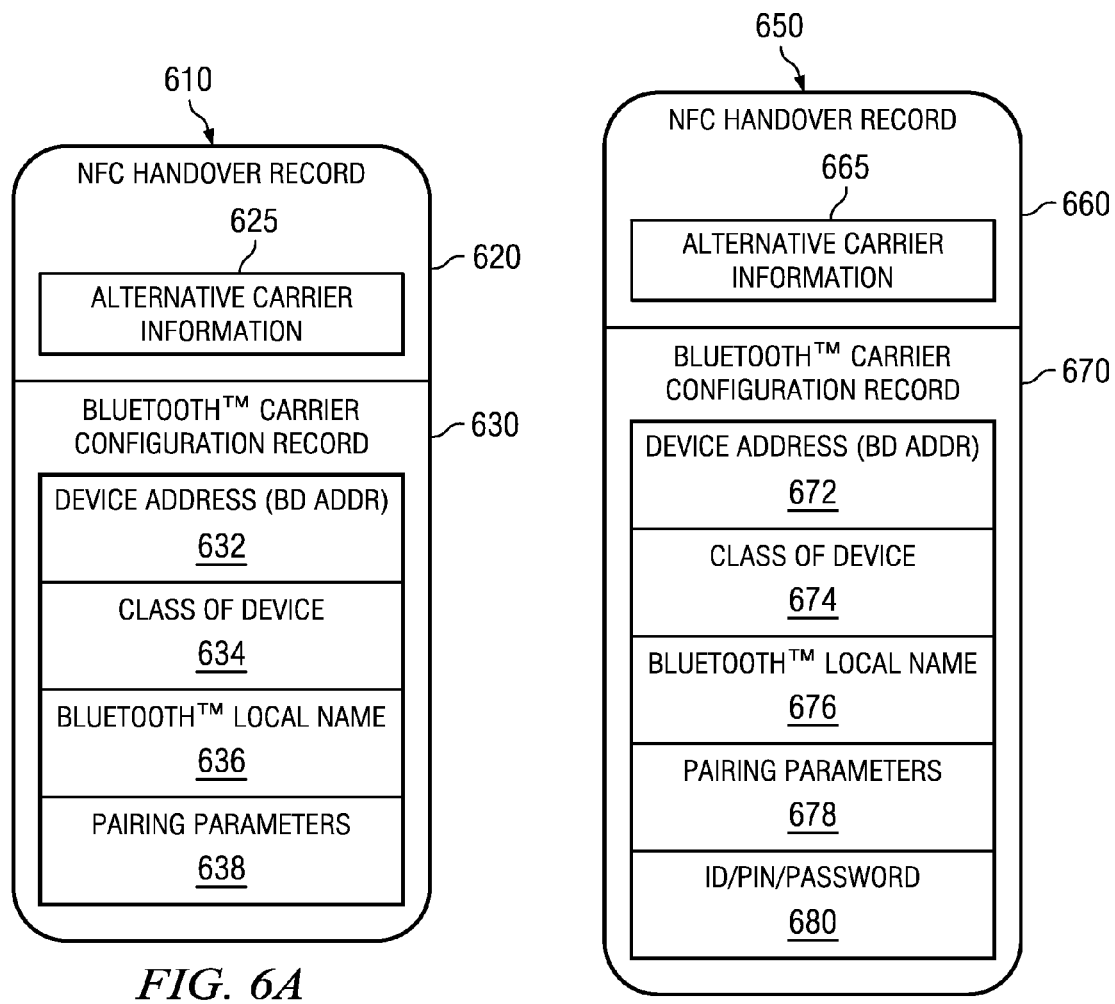
FIG. 6A
FIG. 6B

WIRELESS COMMUNICATION LINK ESTABLISHMENT

TECHNICAL FIELD

The present application relates generally to wireless communication and establishment of a wireless communication link through machine reading.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing an electrical network as a power source. Due to rapid development of the wireless communication devices a number of areas capable of enabling entirely new types of communication applications have emerged.

A wireless communication device, upon establishment of a wireless communication connection for example to gain access to a wireless communication network or to establish direct communication connection with another device, needs to get identification information of the other device to establish wireless communication link with it. The identification information may be received from the other device for example by receiving a wireless advertisement message that may be transmitted by the other device every now and then to announce its presence. Alternatively, the identification information about the other device may be acquired for example by way of machine-reading an object holding the identification information. Irrespective of the way the identification information about the other device has been acquired, the identification information is used when establishing a communication link with the other device.

SUMMARY

Various aspects of examples of the invention are set out in the claims.

According to a first aspect of the present invention, a method is provided comprising receiving, through machine reading a machine-readable object, at least information identifying a wireless communication device, and initiating wireless communication link establishment with the wireless communication device using the received information, wherein the wireless communication link establishment is incorporated with an indication that machine-readable object associated with the wireless communication device was read.

According to a second aspect of the present invention, a computer program product is disclosed, adapted to cause performance of the method according to the first aspect when said program is run on a computer.

According to a third aspect of the present invention, an apparatus is disclosed, comprising means for receiving, through machine reading a machine-readable object, at least information identifying a wireless communication device, and means for initiating wireless communication link establishment with the wireless communication device using the received information, wherein the wireless communication link establishment is incorporated with an indication that machine-readable object associated with the wireless communication device was read.

According to a fourth aspect of the present invention, a method is provided comprising receiving a connection establishment initiation from a wireless communication device, determining whether the connection establishment initiation includes an indication that an associated machine-readable object was read by the wireless communication device, and participating in the wireless connection establishment and performing an associated action in response to determination that an associated machine-readable object was read by the wireless communication device initiating the connection establishment request.

According to a fifth aspect of the present invention, a computer program product is disclosed, adapted to cause performance of the method according to the fourth aspect when said program is run on a computer.

According to a sixth aspect of the present invention, an apparatus is disclosed, comprising means for receiving a connection establishment initiation from a wireless communication device, means for determining whether the connection establishment initiation includes an indication that an associated machine-readable object was read by the wireless communication device, and means for participating in the wireless connection establishment and performing an associated action in response to determination that an associated machine-readable object was read by the wireless communication device initiating the connection establishment request.

According to a seventh aspect of the present invention, an apparatus is disclosed, comprising at least one processor and at least one memory including executable instructions, the at least one memory and the executable instructions being configured to, in cooperation with the at least one processor, cause the apparatus to perform at least the following: receive, through machine reading a machine-readable object, at least information identifying a wireless communication device, and initiate wireless communication link establishment with the wireless communication device using the received information, wherein the wireless communication link establishment is incorporated with an indication that machine-readable object associated with the wireless communication device was read.

According to an eight aspect of the present invention, an apparatus is disclosed, comprising at least one processor and at least one memory including executable instructions, the at least one memory and the executable instructions being configured to, in cooperation with the at least one processor, cause the apparatus to perform at least the following: receive a connection establishment initiation from a wireless communication device, determine whether the connection establishment initiation includes an indication that an associated machine-readable object was read by the wireless communication device, and participate in the wireless connection establishment and perform an associated action in response to determination that an associated machine-readable object was read by the wireless communication device initiating the connection establishment request.

BRIEF DESCRIPTION OF THE DRAWINGS

For a more complete understanding of example embodiments of the present invention, reference is now made to the following description taken in connection with the accompanying drawings in which:

FIG. 5 illustrates a flow diagram showing operations for initiating establishment of a wireless communication link according to an example embodiment of the present invention;

FIG. 6A illustrates an example data record received from a machine-readable object according to an example embodiment of the present invention.

FIG. 6B illustrates an example data record received from a machine-readable object according to an example embodiment of the present invention.

DETAILED DESCRIPTION OF THE DRAWINGS

An example embodiment of the present invention and its potential effects are understood by referring to FIGS. 1 through 7 of the drawings.

Figure 1:
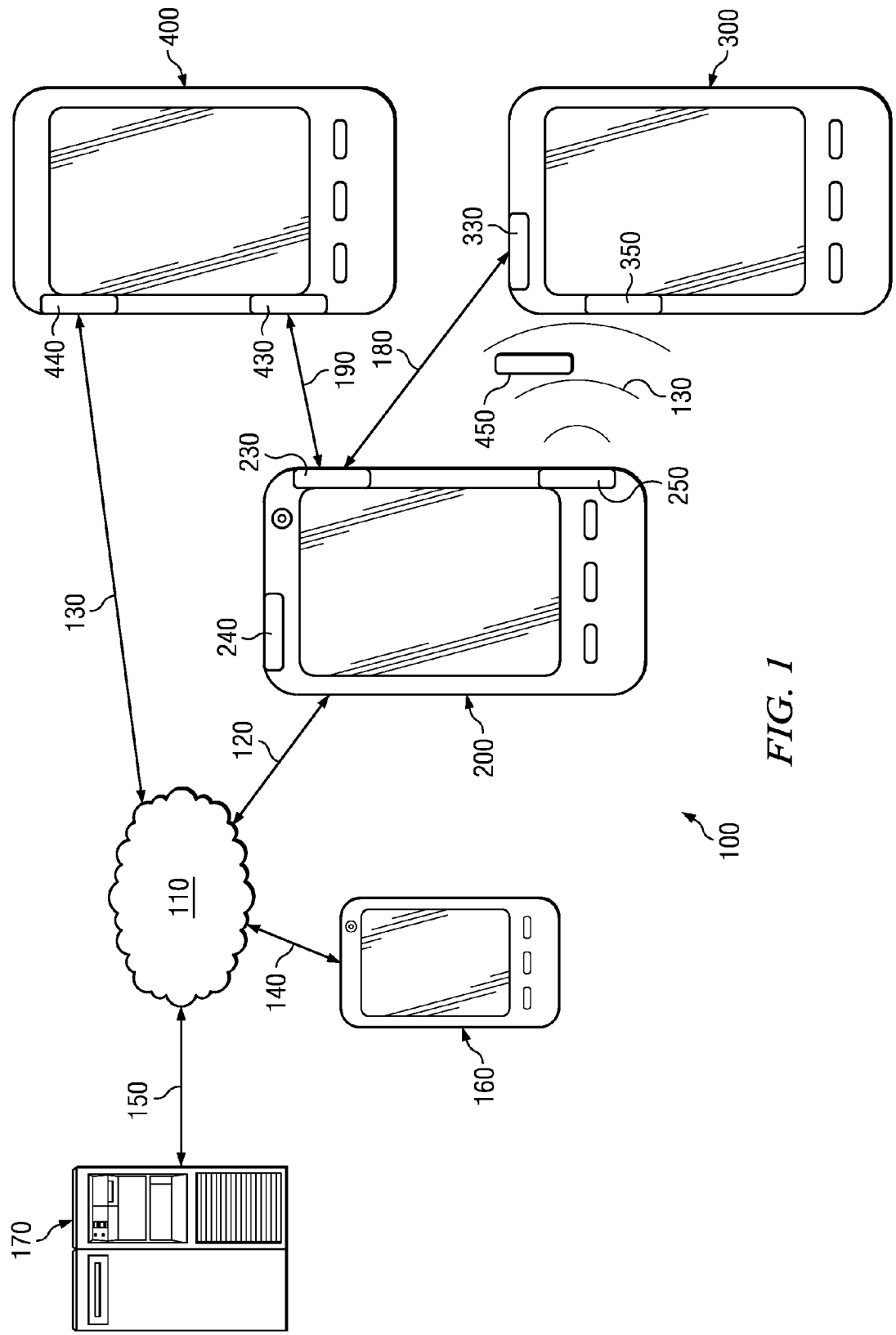
FIG. 1 discloses an example of operational environment in which apparatuses according to an example embodiment of the invention may be used.

FIG. 1 discloses an example of operational environment 100 in which various apparatuses according to an example embodiment of the invention may be used. An apparatus 200, for example a personal computer, an engineering workstation, a personal digital assistant, a portable computer, a computerized watch, a wired or wireless terminal, phone, node, and/or the like, a set-top box, a personal video recorder (PVR), an automatic teller machine (ATM), a game console, or the like is shown having communication means, such as a short-range communications interface 230, configured to communicate wirelessly with other devices, such as device 300 and device 400 via respective short-range communication links 180 and 190. Short-range communication connections may be used for the exchange of information over a local area varying for example from a couple of meters to some hundred of meters. Non-limiting examples of wireless short-range communication technologies comprise Bluetooth™ and Bluetooth™ Low Energy technologies, various Wireless Local Area Network (WLAN) technologies, Wireless Universal Serial Bus (WUSB), ultra-wideband (UWB) and ZigBee (802.15.4, 802.15.4a) technologies.

Apparatus 200 may further be embodied as a portable wireless communications device equipped with wide-area communication means, such as long-range communications interface 240 to connect with network 110 via a wireless communication link 120 to communicate for example with wireless communication device 400 as illustrated in the example of FIG. 1. Depending on the embodiment, the wireless communication link 120 may be provided over a wide-area communication connection. Non-limiting examples of wireless wide-area communication technologies comprise $2^{nd}$ generation (2G) digital cellular networks, for example Global System for Mobile Communications (GSM) that may communicate in the 900 MHz/1.8 GHz bands in Europe and in the 850 MHz and 1.9 GHz bands in the United States. Wide-area communication technologies may further comprise general packet radio service (GPRS) technology, universal mobile telecommunications system (UMTS) technology, code division multiple access (CDMA) technologies, and/or the like.

According to an alternative example embodiment, link 120 may be provided with a wired connection. Non-limiting examples of wired communication technologies include Ethernet, IEEE 1394, universal serial bus (USB) protocol, any other serial or parallel wired connection, and/or the like. Depending on embodiment, network 110 may be either a wireless network, or a wired network. Network 110 may further be connected to other networks. According to a further example embodiment, apparatus 200 may be a stationary device having a wireless and/or a wired interface for communicating with network 110.

As further shown in FIG. 1 various other devices, such as mobile device 160 and server 170 may be connected to the network 110 via respective links 140 and 150, so that apparatus 200 may communicate with any other connected device via the network 110.

According to one example embodiment of the present invention, the apparatus 200, such as a wireless communication device, may initiate communication with one or more wireless communication devices, such as device 300 or device 400 by machine-reading an associated machine-readable object. The associated machine-readable object, such as machine readable tags 350 and 450 of the example shown in FIG. 1 may be read using suitable means for machine-reading the object, such as a near-field communication interface 250. As shown in the example of FIG. 1, the machine-readable object that is associated with an apparatus may be physically located within the associated apparatus, such as machine-readable 350 located within apparatus 300. Alternatively, the machine-readable object may be physically located outside and/or remote from the associated apparatus, such as machine-readable tag 450 outside apparatus 400. In order to read the machine-readable object, the object and reading apparatus needs to be physically close to each other as coverage of a near-field communication is typically from a couple of centimeters to one or two meters depending on the embodiment. The coverage is however very much dependent on used transmission power and dimensions of the entities involved in communication, so coverage up to hundred of meters is achievable.

Example technologies for machine-reading comprise optical reading-, magnetic coupling-, and radio frequency (RF) technologies. In optical reading, a reader or scanner device captures a visual image of an object and translates information encoded on the image into a format that is processed by an associated computer. Example technologies for optical reading comprise barcode technologies that are widely used from marking commercial products in pre-sail manufacturing, logistics and in retail to patient identification in hospitals, etc. Barcode technologies comprise 1D (1 dimensional) barcodes and 2D (2 dimensional) matrix codes and symbologies.

In magnetic coupling, when two conductors are configured such that a change in current flow through one wire induces a voltage across the ends of the other wire through electromagnetic induction they are referred to as mutual-inductively coupled or magnetically coupled. Example uses of magnetic coupling comprise electronic article surveillance technologies, inductive cooking and heating, and also magnetic coupling based object identification concepts.

Example radio frequency (RF) based machine-reading technologies comprise radio-frequency identification (RFID)

including a wide variety of standardized and proprietary RF transmission systems for a large number of different purposes, such as product tagging for inventory handling and logistics, theft prevention purposes at the point of sales and product recycling at the end of the life-cycle of the tagged product. In addition, RFID systems have been introduced for various payment and ticketing concepts comprising public transportation ticketing and payment. As an example, in several European countries and also in Canada and Mexico, there are several public transportation systems based on Calypso, the international electronic ticketing standard for microprocessor contactless smartcards, originally designed by a group of European transit operators. Further, for example in Japan, Hong Kong and Korea, there are Felicity Card (FeliCa) technology based mass transit systems where a rechargeable contactless stored value smart card is used to transfer electronic payments in online or offline systems.

As a subset of RFID technologies, Near Field Communication (NFC) technology has evolved from a combination of existing contactless identification and interconnection technologies. NFC is both a "read" and "write" technology. Communication between two NFC-compatible devices occurs when they are brought within close proximity of each other: a simple wave or touch can establish NFC connection, which is then capable of enabling other known wireless technologies, such as Bluetooth™ or wireless local area network (WLAN). NFC can be used with a variety of devices, from mobile phones that enable payment or transfer information to digital cameras that send their photos to a TV set with just a touch to name a few examples.

As the RFID technologies are becoming more prevalent, there already exists a large amount of RFID based applications, for example transportation tickets, animal and/or human implantations for tracking and other purposes, and the like. Radio-Frequency Identification (RFID) technologies provide wireless systems for automatic identification, tracking and managing of objects via a wireless connection between a tag attached to the object and a reader device, such as apparatus 200. The tag, such as machine readable tag 350 or 450 tag of FIG. 1, may include a transponder that may be active or passive. In the presence of an electromagnetic field created by the reader device, the transponder may transmit at least an object identity signal. According to an example embodiment relating to passive transponder, such as a NFC tag, the tag obtains RF energy from the electromagnetic field created by reader device for obtaining power for operation. Further, the tag may manipulate the electromagnetic field for example by way backscattering to provide a response signal back to the reader device. Irrespective of the way the transponder provides the response signal back to the reader device, the reader device may sense and decode the response signal. So, information from the tag may be received by the reader device via a connectionless communication. In other words, the signal may be received without a logical connection between the reader device and the tag.

Upon machine-reading the machine-readable object associated with another apparatus, such as machine-readable tag 350 associated with apparatus 300 in the example embodiment described in connection with FIG. 1, apparatus 200 may receive information for establishment of a wireless communication link with the other apparatus. According to one embodiment of the present invention, apparatus 200 may then include in the wireless communication link establishment an indication that a machine-readable object associated with the apparatus was read. The other apparatus, such as apparatus 300 or apparatus 400 of FIG. 1 associated with the machine readable tag may then use this indication to perform an action associated with the machine-reading of associated machine-readable object. The action may relate to actual connection establishment for example by way of prioritizing connection establishment attempts including the machine-reading indication, or simplifying certain steps related to the actual connection establishment. Alternatively, the action may be some other action that is not related to the actual connection establishment but is associated with the concept that a device initiating connection establishment has been placed very close to the associated tag.

Figure 2:
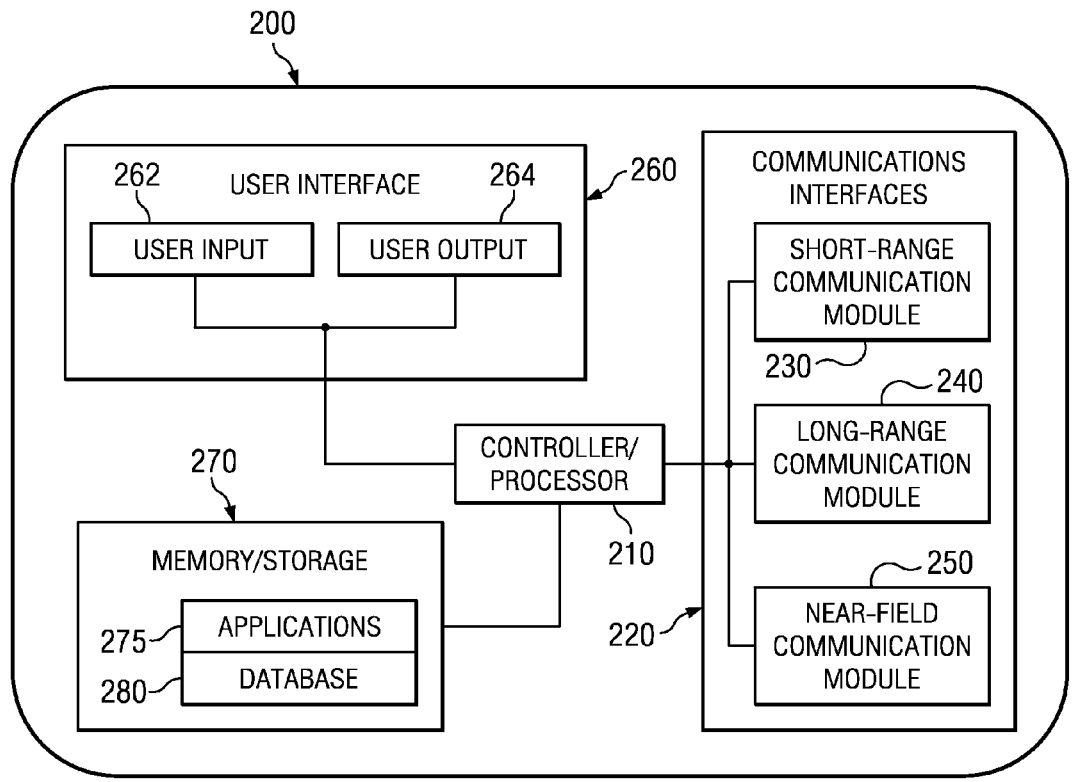
FIG. 2 discloses a modular layout for an example apparatus according to an example embodiment of the present invention.

FIG. 2 discloses a modular layout for an example apparatus according to an example embodiment of the present invention. In FIG. 2, apparatus 200 is broken down into modules configured to cause the apparatus to perform various functionalities. The functionalities may be provided by various combinations of the software and/or hardware components discussed below according to an embodiment of the present invention.

Control module 210 is configured to regulate operation of the apparatus 200. The control module may be embodied as a controlling means, for example as a controlling circuitry or a processor. Inputs for the control module 210 may be received from various other modules comprised within apparatus 200. For example, user interface 260 may provide input to the control module 210 in response to receiving input from a user via user input 262. So, user input received via the user interface 260 may be used as an input in the control module 210 for controlling the operation of the apparatus 200. Control module 210 may interpret and/or process the input data and, in response, may issue one or more control commands to at least one of the other modules within apparatus 200.

In accordance with an example embodiment, apparatus 200, embodied for example as a wireless communication device, comprises communications interfaces 220. Communications interfaces 220 may incorporate one or more communication modules of the apparatus 200. In an example embodiment, the communications interfaces 220 may comprise means for wired and/or wireless communication. As shown in the example of FIG. 2, communications interfaces 220 may comprise a short-range communications module 230 and a long-range communications module 240. It would be understood that although FIG. 2 illustrates only one short-range communication module 230 and one long-range communication module 240 for the sake of clarity, apparatus 200 may comprise any number of further communications modules. For example, two or more additional wired and/or wireless communication modules may be included in the apparatus 200. Apparatus 200 may utilize one or more of these modules to receive information from both local and long distance sources, and to transmit data to recipient devices from the apparatus 200. Communications interfaces 220 may be activated by control module 210, or by control resources local to the sub-modules responding to received messages, environmental influences and/or other devices in communication with the apparatus 200.

Short-range wireless networks provide communication solutions that avoid some of the problems seen in large cellular networks. Bluetooth™ is an example of a short-range wireless technology quickly gaining acceptance in the marketplace. Bluetooth™ enabled wireless communication device may transmit and receive data rates from 720 Kbps up to 2-3 Mbps within a range of 10 meters, and may transmit up to 100 meters with additional power boosting. A user does not actively instigate a Bluetooth™ network. Instead, a plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other piconet members. In addition to Bluetooth™ and Bluetooth™ Low Energy, other popular short-range wireless networks include WLAN (of which "Wi-Fi" local access points communicating in accordance with the IEEE 802.11 standard, is an example), Wireless Universal Serial Bus (WUSB), ultra-wideband (UWB) and ZigBee (802.15.4, 802.15.4a) technologies. All of these wireless mediums have features and advantages that make them appropriate for various applications.

Long-range communication module 240 may comprise a long-range communications interface configured to communicate and exchange information over a long distance in a large geographic area using any of the wide-area communication technologies described earlier in connection with FIG. 1. As a subset of long-range communications module 240, or alternatively operating as an independent module separately coupled to processor 210, the apparatus 200 may comprise a broadcast receiver. The broadcast receiver may be a digital audio- or video receiver, for example a digital audio broadcasting (DAB) or a digital video broadcasting (DVB) receiver, and/or the like. According to an example embodiment, the broadcast receiver comprises a Digital Video Broadcast for Handheld Apparatuses (DVB-H) receiver. The broadcasting transmissions may be encoded so that only certain apparatuses may access the transmitted content. The broadcast transmission may comprise text, audio and/or video information, and data. In an example embodiment, apparatus 200 may receive broadcasts and/or information within the broadcast signal to determine if the apparatus is permitted to view the received content.

In addition to short-range communication module 230 and long-range communication module 240, communications interfaces may comprise a near-field communication module 250 embodied for example as a reader and/or an interrogator for exchanging information via RF transmission over short distances. According to one embodiment of the present invention, the reader and/or interrogator communicates with nearby machine-readable objects, such as tags 350 and 450 of FIG. 1 by sending out an RF signal, which may "wake up" and/or energize any RF transponder and/or a tag within coverage. In response to the RF signal, the reader and/or interrogator may receive a response signal provided by the RF transponder and/or tag located within coverage area of the near-field communication module 250. The information may be received by the near-field communication module 250 over connectionless communication that is a connection without a logical connection between the near-field communication module 250 and the machine-readable object, such as either of tags 350 or 450 of FIG. 1.

Example near-field communication module 250 comprises radio-frequency identification (RFID) module embodied as RFID reader/writer. Alternatively, or in addition, the near-field communication module may 250 comprise a Near Field Communication (NFC) module, or any other communication module capable of machine-reading objects substantially wirelessly over short distances using for example RF signal or electromagnetic coupling and/or induction, or like.

According to one example embodiment any of the communication interfaces 220 comprising the short-range communications module 230, the long-range communications module 240, and the near-field communications module 250 may be equipped with a wired interface that may be used for communicating with another device using a wired communication protocol via an interface such as Ethernet, an IEEE 1394 communication interface, a universal serial bus (USB) interface, and/or the like.

User interface 260 may include visual, audible and/or tactile elements which allow a user to receive data from, and enter data into, the apparatus. Data entered by a user is received via user input module 262 and may be interpreted by control module 210, for example to affect the behavior of apparatus 200. User-inputted data may also be transmitted via any of the communication modules of the communications interfaces 220 to another device. Information may also be received by other devices at the apparatus 200 via communications interfaces 220. Control module 210 may cause this information to be transferred to user interface 260 for presentation to the user via user output module 264. User interface 260 may comprise one or more user input and output modules, and there may also be a module operating both as a user input module 262 and user output module 264, for example a touch screen display operating as a tactile user interface.

Apparatus 200 may further comprise a memory and/or storage 270. Memory/storage 270 may be connected to controller 210. Memory/storage 270 may include at least one database 280. Memory/storage 270 may further store executable instructions that are configured to cause the apparatus 200 to perform various actions in co-operation with the control module 210.

Figure 3A:
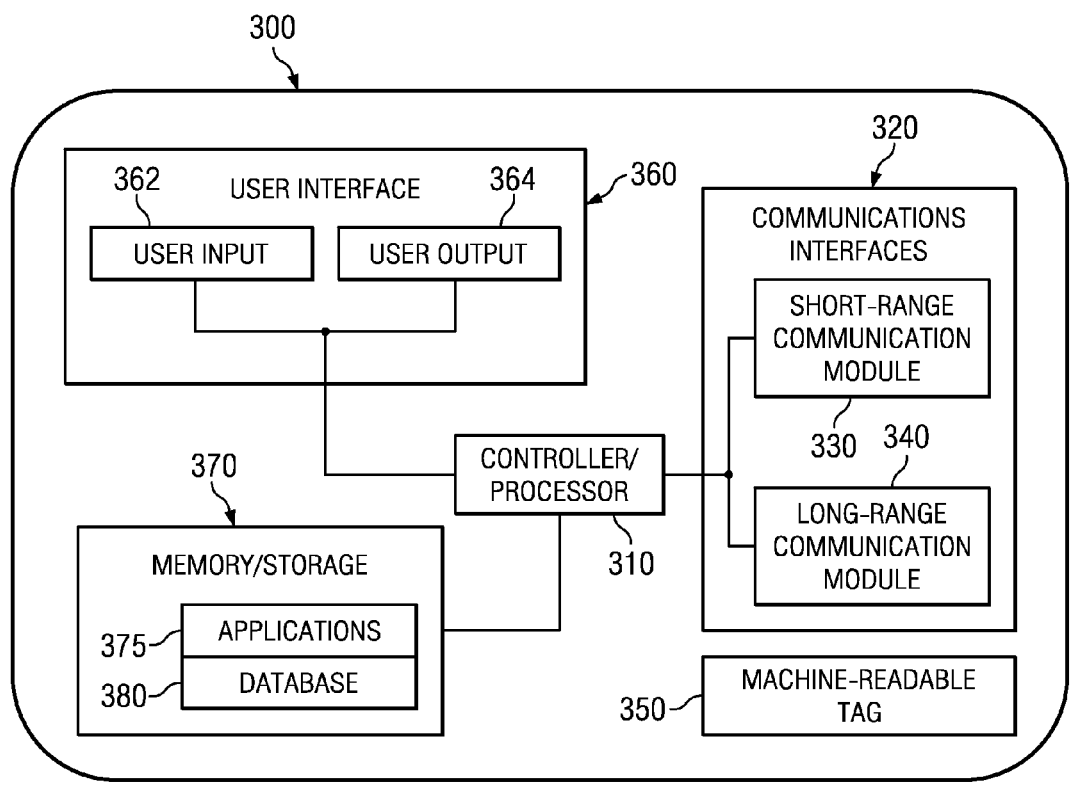
FIG. 3A discloses a modular layout for another example apparatus according to an example embodiment of the present invention.

FIG. 3A illustrates a modular layout for another example apparatus according to an example embodiment of the present invention. In FIG. 3A, example apparatus 300 of FIG. 1 is broken down into modules configured to cause the apparatus to perform various functionalities. The functionalities may be provided by various combinations of the software and/or hardware components discussed below according to an embodiment of the present invention.

Control module 310, similarly to control module 210 of apparatus 200 is configured to regulate operation of the apparatus 300. The control module may be embodied as a controlling means, for example as a controlling circuitry or a processor. Inputs for the control module 310 may be received from various other modules comprised within apparatus 300. For example, user interface 360 may provide input to the control module 310 in response to receiving input from a user via user input 362. So, user input received via the user interface 360 may be used as an input in the control module 310 for controlling the operation of the apparatus 300. Control module 310 may interpret and/or process the input data and, in response, may issue one or more control commands to at least one of the other modules within apparatus 300.

Similarly to apparatus 200, in accordance with an example apparatus 300, embodied for example as a wireless communication device, comprises communications interfaces 320. Communications interfaces 320 may incorporate one or more communication modules of the apparatus 300. In an example embodiment, the communications interfaces 320 may comprise means for wired and/or wireless communication. As shown in the example of FIG. 3A, communications interfaces 320 may comprise a short-range communications module 330 and a long-range communications module 340. Similarly to apparatus 200, apparatus 300 may comprise any number of further communications modules. Apparatus 300 may utilize one or more of these modules to receive information from both local and long distance sources, and to transmit data to recipient devices from the apparatus 300. Communications interfaces 320 may be activated by control module 310, or by control resources local to the sub-modules responding to received messages, environmental influences and/or other devices in communication with the apparatus 300.

In addition to short-range communication module 330 and long-range communication module 340, apparatus 300 may be contacted by way of transmitting RF interrogation signal that is received by machine-readable tag 350. The machine-readable tag 350 is equipped with means, such as an antenna coil, for separating RF energy from the received signal. The received signal may then be analyzed by a microchip and a response signal may be transmitted including, at least identification information identifying associated apparatus 300. The transmitted identification information may include information suitable for initiating establishment of a wireless communication connection with apparatus 300. Depending on the embodiment, the transmitted identification information may comprise identification information relating to either of the short-range communication module 330, or the long-range communication module 340. According to one embodiment, the identification information comprises at least a Bluetooth address of apparatus 300. According to an alternative embodiment, the response signal may include information identifying a wireless short-range communication network to which the associated apparatus 300 belongs to.

According to one embodiment of the present invention, machine-readable tag 350 is a passive RF transponder and/or tag that require external energy for operation, which can be harvested from received RF signal. Machine-readable tag 350 may further be integrated within apparatus 300, or be detachable so that it can be removed from apparatus if preferred. According to an alternative embodiment of the present invention, machine-readable tag 350 is a semi-passive RF transponder and/or tag that can receive power from the apparatus 300, but requires external energy for communication. Irrespectively, in this example embodiment the machine-readable tag 350 has no means for providing output to control module 310 of apparatus 300 whether it has been subjected to external excitation signal and transmitted the identification information associated with apparatus 300.

User interface 360, similarly to user interface 260 of apparatus 200, may include visual, audible and/or tactile elements which allow a user to receive data from, and enter data into, the apparatus. Data entered by a user is received via user input module 362 and may be interpreted by control module 310, for example to affect the behavior of apparatus 300. User-inputted data may also be transmitted via any of the communication modules of the communications interfaces 320 to another device. Information may also be received from other devices at the apparatus 300 via communications interfaces 320. Control module 310 may cause this information to be transferred to user interface 360 for presentation to the user via user output module 364. User interface 360 may comprise one or more user input and output modules, and there may also be a module operating both as a user input module 362 and user output module 364, for example a touch screen display operating as a tactile user interface.

Apparatus 300 may further comprise a memory and/or storage 370. Memory/storage 370 may be connected to controller 310. Memory/storage 370 may include at least one database 380. Memory/storage 370 may further store executable instructions that are configured to cause the apparatus 300 to perform various actions in co-operation with the control module 310.

Figure 3B:
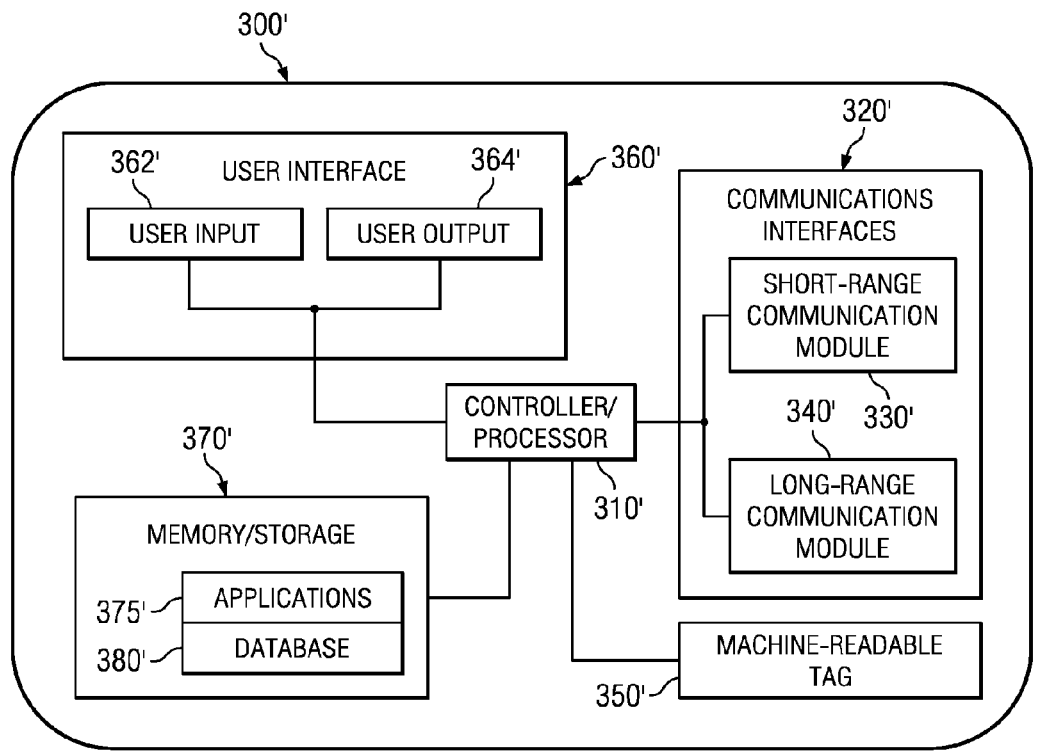
FIG. 3B discloses a modular layout for the other example apparatus according to another example embodiment of the present invention.

FIG. 3B discloses a modular layout for the other example apparatus according to another example embodiment of the present invention. In FIG. 3B, example apparatus 300' is broken down into modules configured to cause the apparatus to perform various functionalities similar to apparatus 300 of FIG. 3A. The functionalities may be provided by various combinations of the software and/or hardware components as in apparatus 300. Example apparatus 300' is basically similar to apparatus 300 of FIG. 3A except that machine-readable tag 350' is connected to control module 310. This connection allows the control module 310' to update contents of the machine-readable tag 350' in response to changing system parameters at apparatus 300'. For example, control module 310' may receive in input from short-range communication module 330', such as Wi-Fi radio modem, that there is a change in connectivity information associated with the apparatus 300', such as changing Internet Protocol (IP) address. This information may then be updated to machine-readable tag 350' according to one embodiment of the present invention. Further, machine-readable tag 350' may be provided with means to provide output to control module 310' of apparatus 300' whether it has been subjected to external excitation signal and transmitted the identification information associated with apparatus 300'. However, there are no means for the machine-readable tag 350' to inform the identity of the apparatus that provided the excitation signal and to which the identification information associated with apparatus 300' was transmitted.

Figure 4:
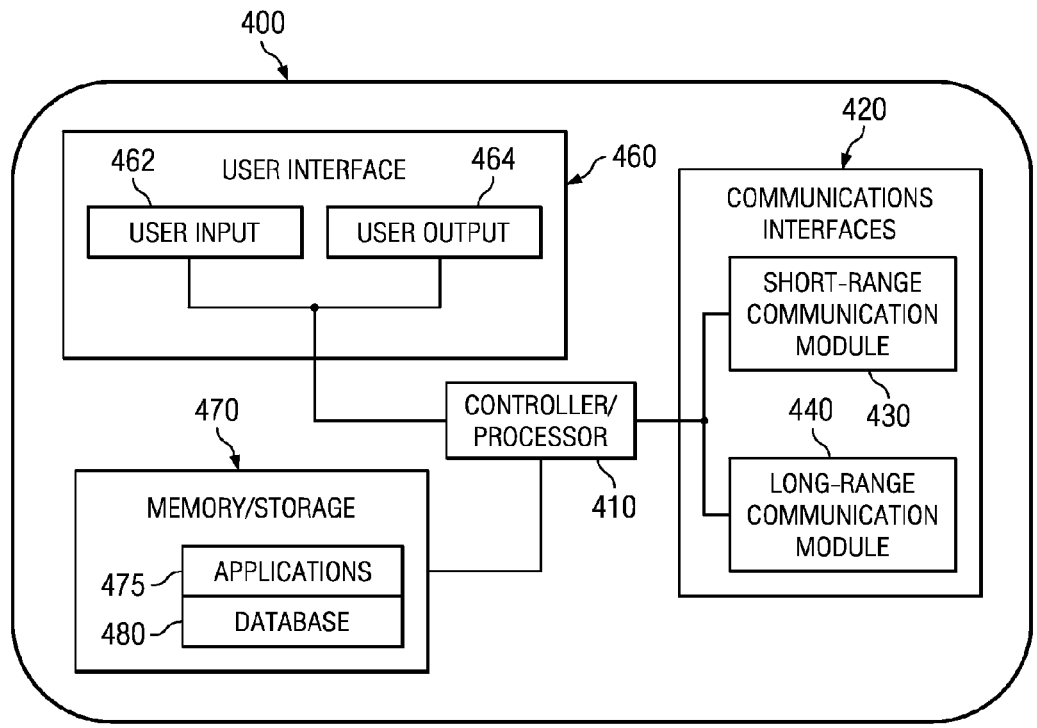
FIG. 4 discloses a modular layout for the other example apparatus according to yet another example embodiment of the present invention.

FIG. 4 discloses a modular layout for the other example apparatus according to yet another example embodiment of the present invention. In FIG. 4, example apparatus 400 of FIG. 1 is broken down into modules configured to cause the apparatus to perform various functionalities. The functionalities may be provided by various combinations of the software and/or hardware components discussed below according to an embodiment of the present invention. Apparatus 400 is basically similar to apparatus 300 except that the machine-readable tag 450 is a separate entity that is not integrated within apparatus 400. However, apparatus 400 and machine-readable tag 450 are associated with each other so that the machine-readable 450, upon receiving an excitation signal, is configured to transmit information at least identifying associated apparatus 400.

According to one embodiment, machine-readable tag 450 is a passive RF transponder and/or tag that require external energy for operation. Machine-readable tag 450 is provided with means, such as an antenna coil, for separating RF energy from received signal. The received signal may then be analyzed by a microchip and a response signal may be transmitted including, at least identification information identifying associated apparatus 400. The transmitted identification information may include information suitable for initiating establishment of a wireless communication connection with apparatus 400. Depending on the embodiment, the transmitted identification information may comprise identification information relating to either of short-range communication module 430, or long-range communication module 440 of apparatus 400. According to one embodiment, the identification information comprises at least a Bluetooth address of apparatus 400.

As the machine-readable tag 450 is physically separated from apparatus 400, it may take any physical form, such as a small detachable sticker that can be attached to some other physical object such as inside or outside furniture, wall or any kind of poster and/or leaflet made from basically any type of material, or like. Alternatively, the machine-readable tag 450 may be integrated into some other object, such as in-house or outside furniture, or wall of a building, or like depending on the embodiment.

FIG. 5 illustrates an example method 500 as a flow diagram showing operations for initiating establishment of a wireless communication link according to an example embodiment of the present invention. Method 500 starts with block 510, where an apparatus, such as apparatus 200, machine-reads a machine-readable object, such as machine readable tag 350 or 450. Machine-reading comprises according to one embodiment transmission of one or more interrogation signals to power up the machine-readable object and receiving of information from the powered machine-readable object. Then, on block 520 the received information is processed and analyzed for example by control module 210 of apparatus 200 to determine whether the received information includes at least information identifying an apparatus associated with the read machine-readable object. According to one embodiment, the information received from the machine-readable object may further include a dedicated indication, such as a "machine-readable tag read" flag or parameter.

According to one embodiment, the information identifying the apparatus associated with the machine-readable object comprises devices address, such as Bluetooth address usable in connection with Bluetooth™ communication protocol or similar Media Access Control (MAC) address usable for example in connection with Wi-Fi communication protocols, or like. Upon receiving at least the device address in block 520, apparatus, such as apparatus 200 of FIG. 1, may process the received information including the device address and identify communication protocol with which to initiate connection establishment with the device associated with the machine-readable object, such as apparatus 300 or 400 of FIG. 1.

Example data records received from a machine-readable object, such as a NFC tag according to an example embodiment, including Bluetooth™ carrier configuration is shown on FIGS. 6A and 6B. As shown on the example data record of FIG. 6A, the data record 610 received from a machine-readable object may include an alternative carrier indication 625 included in the NFC communication record 620 portion of the data record 610. Bluetooth™ configuration record 630 portion of the data record 610 may comprise device address (BD ADDR) 632 of the associated device, such as apparatus 300 or 400 of FIG. 1, which is used when establishing a connection with the of the associated device. Additional information included in the Bluetooth™ configuration record 630 may include a class of device indication 634, which informs the device type of the associated device, Bluetooth™ local name 636 and Pairing parameters 638 that can be used when establishing a secure connection with the associated device, such as apparatus 300 or 400 of FIG. 1. According to an example embodiment of the present invention, similar data record can be used for the purposes of setting up a Wi-Fi connection, wherein the Bluetooth™ configuration record 630 may be replaced with Wi-Fi carrier configuration record including information, such as a Service Set Identifier (SSID) that identifies the network through which to connect with the associated device, and other related information, such as authentication and/or encryption type information, or like.

According to one embodiment, the information received from the machine-readable object may include identification information relating to several communication protocols, such as both the Bluetooth™ configuration record and the Wi-Fi carrier configuration record described above, so that the receiving apparatus may select one of the communication protocols for connecting with the wireless communication device associated with machine-readable object based on its preferences and/or needs relating to the connection establishment.

Referring back to method 500, in case it is determined in block 520 that the received information includes at least identification information of a wireless communication device associated with the machine-readable tag, such as device 300 or 400 of FIG. 1, connection establishment with the wireless communication device is initiated with an indication that associated machine-readable object has been read as shown in block 530. The received information may include, in addition to the information identifying the apparatus associated with the read machine-readable object, a code or similar indication that may be included in the connection establishment initiation to provide an additional parameter indicating that an associated machine-readable object has been read. According to one embodiment of the present invention, the code or similar indication may include further information, such as a serial number and/or a character string, which may more or less unique for the machine-readable object that can be considered as some sort of a guarantee that the specific machine-readable tag was really read by the apparatus. The apparatus receiving the additional information through machine-reading may then use this additional information as an additional "proof" during connection establishment with wireless communication device associated with the machine-readable object. By providing such information to indicate that the apparatus, such as apparatus 200 of FIG. 1, has read associated machine-readable tag, wireless communication device, such as device 300 or 400 of FIG. 1, can be sure that the apparatus initiating connection establishment is not just faking that it has read associated machine-readable object, such as machine-readable tag 350 or 450 of FIG. 1, as the serial number and/or character string can be obtained only by reading the associated machine-readable object. According to one embodiment of the present invention, there may be a plurality of machine-readable objects associated with a single wireless communication device each having different codes distinguishing the machine-readable object from other machine-readable objects.

FIG. 6B illustrates an example data record 650 according to an example embodiment of the present invention, having NFC communication record 660 portion and Bluetooth™ configuration record 670 similarly as the data record 610 of FIG. 6A. However, there is an additional identification (ID), PIN or password indication 680 included in the Bluetooth™ configuration record 670 portion of the data record 650, which can be used by the reading device during connection set up with an apparatus associated with the NFC tag, such as apparatus 300 or 400 of FIG. 1, as additional evidence for guaranteeing that the specific machine-readable tag was really read by the apparatus initiating connection establishment. Alternatively, the additional identification (ID), PIN or password indication 680 may be included in the NFC communication record 660 portion of the data record 650. According to an example embodiment of the present invention, similar data record can be used for the purposes of setting up a Wi-Fi connection, wherein the Bluetooth™ configuration record 630 may be replaced with Wi-Fi carrier configuration record including information, such as a Service Set Identifier (SSID) that identifies the network through which to connect with the associated device, and other related information, such as authentication and/or encryption type information, or like. In any case, according to this embodiment of the present invention, the Wi-Fi carrier configuration record comprises also the additional identification (ID), PIN or password indication that can be used by the reading device during connection set up with an apparatus associated with the NFC tag, such as apparatus 300 or 400 of FIG. 1, as additional evidence for guaranteeing that the specific machine-readable tag was really read by the apparatus initiating connection establishment. Alternatively, the additional identification (ID), PIN or password indication may be included in the NFC communication record portion of the data record similarly as in the Bluetooth™ example described above.

In case it is determined that no identification information of an apparatus associated with the machine-readable object is included in the received information, connection establishment with the wireless communication device is initiated in a conventional manner with no indication as shown in block 540.

According to one embodiment, the indication that associated machine-readable object has been read may be included in service level connection, such as in Service Discovery Protocol (SDP) in connection with Bluetooth™ communication protocol so that apparatuses can exchange information about initiation of connection establishment in response to reading of the machine-readable object during the connection establishment procedure. This type of "announcement service" indication included in SDP does not require any changes in the actual Bluetooth™ communication protocol. Alternatively, the indication that associated machine-readable object has been read may be included in device level connection, such as by specifying such an indication to be included in one or more Bluetooth™ communication protocol lower layer messages. In connection with Wi-Fi, the indication may be included in one or more vendor specific information elements that may be included for example in IEEE 802.11 association frames, which are used when initiating connection establishment with a Wi-Fi network. Alternatively, new Media Access Control parameters and/or attributes may be defined to IEEE 802.11 standard specifications for some connection setup frames to provide similar indication. Further, the indication may be also carried on higher layers, such as for example on Internet Protocol (IP), ZeroConf, UPnP, or SSDP messaging depending on the embodiment.

Figure 7:
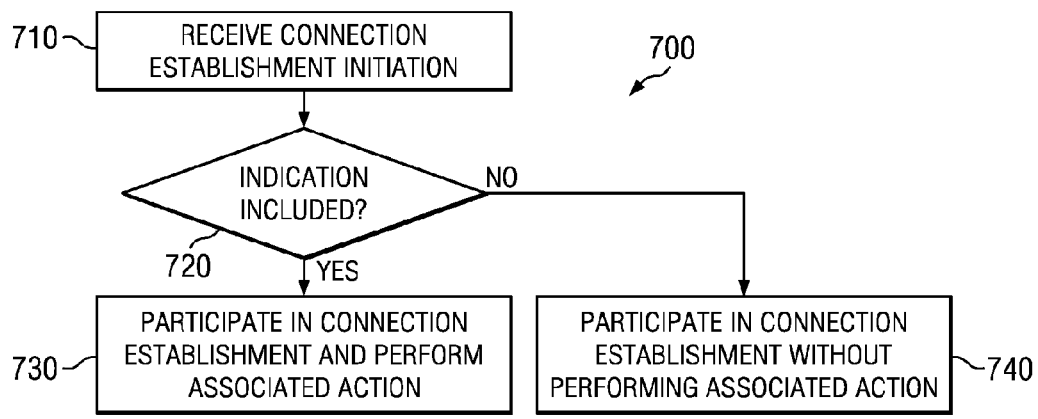
FIG. 7 illustrates a flow diagram showing operations for participating in establishment of a wireless communication link according to an example embodiment of the present invention.

FIG. 7 illustrates an example method 700 as a flow diagram showing operations for participating in establishment of a wireless communication link according to an example embodiment of the present invention. Method 700 starts with block 710, where an apparatus, such as apparatus 300 or 400 of FIG. 1, receives a wireless communication connection establishment initiation from an external device. In block 720, received connection establishment initiation is processed and analyzed for determining whether an indication that associated machine-readable object has been read is included in the connection establishment initiation. In case the determination of block 720 shows that the received connection establishment initiation includes the indication that associated machine-readable object has been read, method continues with block 730 where apparatus participates in the connection establishment and performs an associated action. According to one embodiment, when a wireless communication device, such as apparatus 300 or 400 of FIG. 1, receives an indication that the connection establishment initiation comes from an apparatus that has read the associated machine-readable object, it may allow connection establishment without the need of any additional security mechanism or verification. According to another embodiment, when a wireless communication device receives an indication that the connection request comes from an apparatus that has read the associated machine-readable object, an appropriate server application can be started and enabled only for those network interfaces which were advertised in the machine-readable object.

According to one embodiment, the received connection establishment initiation includes, instead or in addition to the indication that associated machine-readable has been read, a code or similar indication associated with a machine-readable object that has been read. This information may be used as an additional guarantee/proof parameter indicating that the associated machine-readable object has been read. This code and/or indication may be used in order to create additional "trust" with the apparatus initiating connection establishment as the code and/or indication is more of less unique for the associated machine-readable object. So, an apparatus initiating connection establishment including such information has read the associated machine-readable code and therefore for example the connection establishment initiation may be prioritized over other connection establishment initiations. Further, such connection establishment initiations may be accepted with a reduced set of security verifications as an implementation of the additional trust between the devices. Alternatively, or in addition, the wireless communication device may initiate an application or service to communicate using only the network interface from which the connection establishment initiation was received.

According to one embodiment the code and/or indication may be used in connection with determination of which associated action to perform in block 730. According to one embodiment of the present invention, there may be a plurality of machine-readable objects associated with a single wireless communication device each having different codes distinguishing the machine-readable object from other machine-readable objects. So, there may be different actions associated with reading of different machine-readable objects upon initiation of a wireless connection establishment. As an example, one machine-readable object may be associated with the action of connecting to a closeby printer and printing a brochure of car model that is currently being presented on a car exhibition. This machine-readable object may be attached e.g. next to the car model being presented. On the other hand, the printer may be provided with an integrated machine-readable object that allows devices to connect with the printer and print the information currently shown on the device screen so that potential buyers can for example take a picture of the car being presented and print it out. In addition, there may also be another machine-readable object integrated on the back of the printer to connect with the printer and get online service via network in case the printer does not function properly, to name a few non-limiting examples.

Referring back to method 700, in case the determination of block 720 shows that the received connection establishment initiation does not include the indication that associated machine-readable object has been read, the method continues with block 740 where apparatus participates in the connection establishment in a conventional manner without performing any additional and/or associated actions. Alternatively, apparatus may bypass the connection establishment initiation and prioritize some other connection establishment initiation including the indication that associated machine-readable object has been read over this connection establishment.

Without in any way limiting the scope, interpretation, or application of the claims appearing below, a technical effect of one or more of the example embodiments disclosed herein may be receiving identification information associated with a wireless communication device by machine-reading a machine-readable object associated with the wireless communication to initiate establishment of a wireless communication connection with the wireless communication using the received information, wherein the establishment of a communication connection is included with an indication that a machine-readable object associated with the wireless communication device was read. Another technical effect may be receiving a connection establishment initiation including an indication that an associated machine-readable object was read, and participating in connection establishment and performing an action configured to be performed when receiving such an indication.

Various operations and/or the like described herein may be executed by and/or with the help of computers. Further, for example, devices described herein may be and/or may incorporate computers. The phrases "computer", "general purpose computer", and the like, as used herein, refer but are not limited to a media device, a personal computer, an engineering workstation, a personal digital assistant, a portable computer, a computerized watch, a wired or wireless terminal, phone, node, and/or the like, a set-top box, a personal video recorder (PVR), an automatic teller machine (ATM), a game console, and/or the like.

Embodiments of the present invention may be implemented in software, hardware, application logic or a combination of software, hardware and application logic. The software, application logic and/or hardware may reside on a memory of any of the apparatuses 200 and 300 of FIG. 1. In an example embodiment, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 8. A computer-readable medium may comprise a computer-readable storage medium that may be any media or means that may contain or store the instructions for use by or in connection with an instruction execution system, apparatus, or device, such as a computer.

Figure 8:
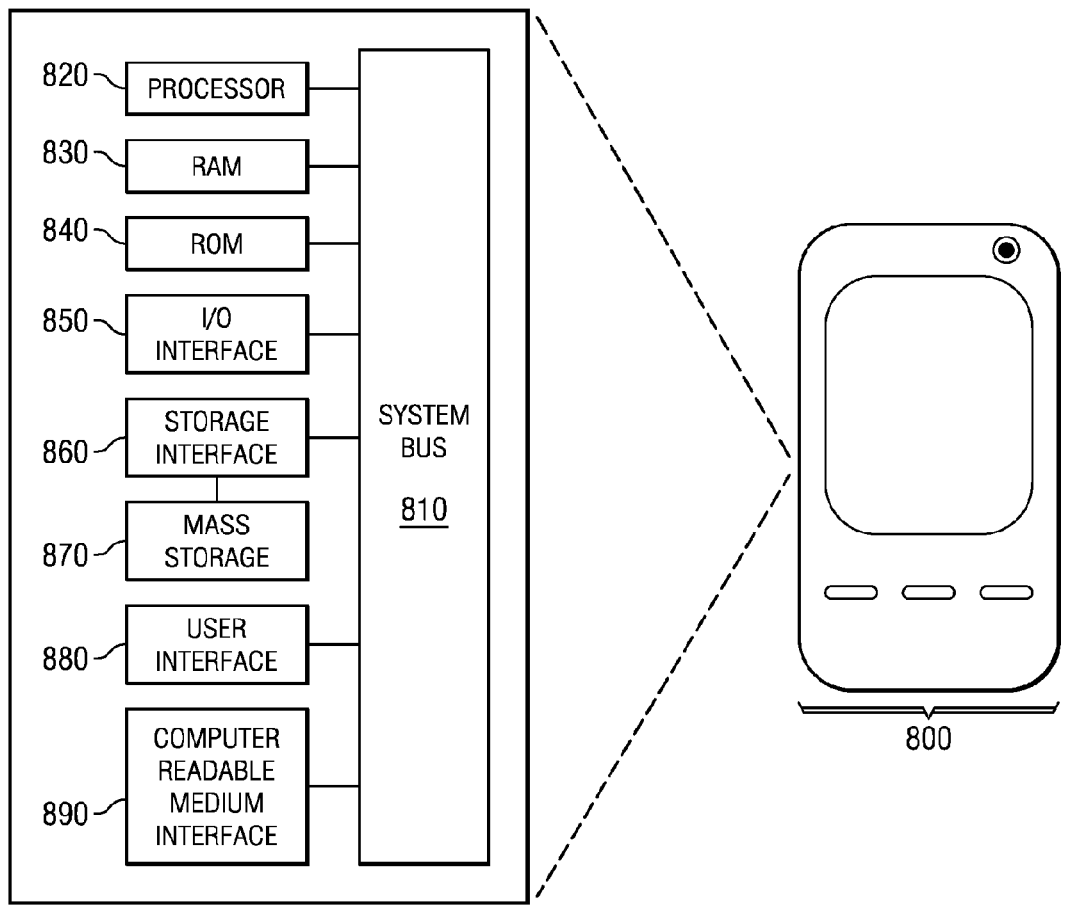
FIG. 8 discloses an apparatus comprising example hardware for implementing computer software instructions stored in the apparatus according to an example embodiment of the present invention.
Figure 8:
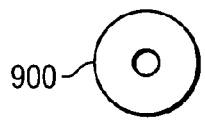

The phrases "general purpose computer", "computer", and the like may also refer to one or more processors operatively connected to one or more memory or storage units, wherein the memory or storage may contain data, algorithms, and/or program code, and the processor or processors may execute the program code and/or manipulate the program code, data, and/or algorithms. Accordingly, example computer 800 as shown in FIG. 8 that may be considered as one embodiment of any of the apparatuses 200, 300 or 400 of FIG. 1, and may include various hardware modules for causing the computer to implement one or more embodiments of the present invention. According to one example, the computer 800 include a system bus 810 which may operatively connect processor 820, random access memory 830, read-only memory 840 that may store for example a computer code for the computer 800 in a non-transitory manner to perform the example methods illustrated on FIGS. 5 and 7. The system bus 810 may further operatively connect input output (I/O) interface 850, storage interface 860, user interface 880 and computer readable medium interface 890. Storage interface 860 may comprise or be connected to mass storage 870.

Mass storage 870 may be a hard drive, optical drive, or the like. Processor 820 may comprise a microcontroller unit (MCU), a digital signal processor (DSP), or any other kind of processor. Computer 800 as shown in this example also comprises a touch screen and keys operating in connection with the user interface 880. In various example embodiments, a mouse, and/or a keypad may alternately or additionally be employed. Computer 800 may additionally include the computer readable medium interface 880, which may be embodied by a card reader, a DVD drive, a floppy disk drive, and/or the like. Thus, media containing program code, for example for performing method 500 of FIG. 5, may be inserted for the purpose of loading the code onto the computer.

Computer 800 may run one or more software modules designed to perform one or more of the above-described operations. Corresponding program code may be stored on a non-transitory physical media 900 such as, for example, DVD, CD-ROM, and/or floppy disk. It is noted that any described division of operations among particular software modules is for purposes of illustration, and that alternate divisions of operation may be employed. Accordingly, any operations discussed as being performed by a software module may instead be performed by a plurality of software modules. Similarly, any operations discussed as being performed by a plurality of modules may instead be performed by a single module. It is noted that operations disclosed as being performed by a particular computer may instead be performed by a plurality of computers.

According to an example embodiment, a computer program product is provided, the computer program product comprising computer executable program code recorded on a non-transitory computer readable storage medium, the computer executable program code comprising a code for causing receipt of at least information identifying a wireless communication device through machine reading a machine-readable object; and a code for causing initiation of wireless communication link establishment with the wireless communication device using the received information, wherein the wireless communication link establishment is incorporated with an indication that machine-readable object associated with the wireless communication device was read.

According to another example embodiment, a computer program product is provided, the computer program product comprising computer executable program code recorded on a non-transitory computer readable storage medium, the computer executable program code comprising a code for causing receipt of a connection establishment initiation from a wireless communication device, a code for causing determination whether the connection establishment initiation includes an indication that an associated machine-readable object was read by the wireless communication device; and a code for causing participation in the wireless connection establishment and performance of an associated action in response to determination that an associated machine-readable object was read by the wireless communication device initiating the connection establishment request.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
receiving, at an apparatus, through machine reading a machine-readable object, at least information identifying a wireless communication device, wherein the received at least information identifying the wireless communication device comprises at least a device identifier for connecting with the wireless communication device over a certain communication protocol corresponding to the received device identifier, and wherein the machine-readable object is at least one of a radio-frequency identification (RFID) tag, a near field communication (NFC) tag, a magnetically coupled device and an image that contains the information encoded; and initiating, by the apparatus, wireless communication link establishment with the wireless communication device over the certain communication protocol using the received device identifier, wherein the wireless communication link establishment is incorporated with an indication that the machine-readable object associated with the wireless communication device was read, and wherein initiating wireless communication link establishment with the wireless communication device comprises selecting the certain wireless communication protocol corresponding to the received device identifier.

2. A method according to claim 1, wherein the information received through machine-reading the machine-readable object further comprises information associated with the machine-readable object.

3. A method according to claim 2, wherein wireless communication link establishment is further incorporated with the additional information associated with the machine-readable object.

4. An apparatus, comprising:
at least one processor; and
at least one memory including executable instructions, the at least one memory and the executable instructions being configured to, in cooperation with the at least one processor, cause the apparatus to perform at least the following:
receive at least information identifying a wireless communication device through machine reading a machine-readable object, wherein the received at least information identifying the wireless communication device comprises at least a device identifier for connecting with the wireless communication device over a certain communication protocol corresponding to the received device identifier, and
wherein the machine-readable object is at least one of a radio-frequency identification (RFID) tag, a near field communication (NFC) tag, a magnetically coupled device and an image that contains the information encoded; and
initiate a wireless communication link establishment with the wireless communication device over the certain communication protocol using the received device identifier, wherein the wireless communication link establishment is incorporated with an indication that the machine-readable object associated with the wireless communication device was read, and wherein initiating wireless communication link establishment with the wireless communication device comprises selecting the certain wireless communication protocol corresponding to the received device identifier.

5. An apparatus according to claim 4, wherein the at least one memory and the executable instructions are configured to, in cooperation with the at least one processor, cause the apparatus to further perform at least the following:
receive information associated with the machine-readable object; and
incorporate wireless communication link establishment with the received information associated with the machine-readable object.

6. A method, comprising:
receiving, at an apparatus, a connection establishment initiation from a wireless communication device;
determining, by the apparatus, whether the connection establishment initiation includes an indication that an associated machine-readable object was read by the wireless communication device,
wherein reading of the machine readable object provides the wireless communication device with information comprising at least an apparatus identifier for connecting with the apparatus over a selected certain communication protocol corresponding to the apparatus identifier, and
wherein the machine-readable object is at least one of a radio-frequency identification (RFID) tag, a near field communication (NFC) tag, a magnetically coupled device and an image that contains the information encoded; and
participating, by the apparatus, in the wireless connection establishment and performing an associated action in response to determination that an associated machine-readable object was read by the wireless communication device initiating the connection establishment.

7. A method according to claim 6, wherein the associated action comprises prioritizing the connection establishment initiation from other connection establishment initiations.

8. A method according to claim 6, wherein the associated action comprises at least accepting the connection establishment initiation with a reduced set of security verifications.

9. A method according to claim 6, wherein the associated action comprises at least initiating of an application or service to communicate using only the network interface from which the connection establishment initiation was received.

10. A method according to claim 6, further comprising:
determining, by the apparatus, that the connection establishment initiation includes additional information associated with a particular machine-readable object; and
performing, by the apparatus, an action associated with the machine-readable object.

11. An apparatus, comprising:
at least one processor; and
at least one memory including executable instructions, the at least one memory and the executable instructions being configured to, in cooperation with the at least one processor, cause the apparatus to perform at least the following:
receive a connection establishment initiation from a wireless communication device;
determine whether the connection establishment initiation includes an indication that an associated machine-readable object was read by the wireless communication device,
wherein reading of the machine readable object provides the wireless communication device with information comprising at least an apparatus identifier for connecting with the apparatus over a selected certain communication protocol corresponding to the apparatus identifier, and
wherein the machine-readable object is at least one of a radio-frequency identification (RFID) tag, a near field communication (NFC) tag, a magnetically coupled device and an image that contains the information encoded; and participate in the wireless connection establishment and perform an associated action in response to determination that an associated machine-readable object was read by the wireless communication device initiating the connection establishment.

12. An apparatus according to claim 11, wherein the associated action comprises at least prioritizing the connection establishment initiation from other connection establishment initiations.

13. An apparatus according to claim 11, wherein the associated action comprises at least accepting connection establishment initiation with a reduced set of security verifications.

14. An apparatus according to claim 11, wherein the associated action comprises at least initiation of an application or service to communicate using only the network interface from which the connection establishment initiation was received.

15. An apparatus according to claim 11, wherein the at least one memory and the executable instructions being configured to, in cooperation with the at least one processor, cause the apparatus to further perform at least the following:
   determine that the connection establishment initiation includes a code associated with a particular machine-readable object; and
   perform an action associated with the machine-readable object.

16. A computer program product comprising computer executable program code recorded on a computer readable non-transitory storage medium, the computer executable program code comprising:
   code for receiving, through a machine reading a machine-readable object, at least information identifying a wireless communication device, wherein the received at least information identifying the wireless communication device comprises at least a device identifier for connecting with the wireless communication device over a certain communication protocol corresponding to the received device identifier; and
   code for initiating wireless communication link establishment with the wireless communication device over the certain communication protocol using the received device identifier, wherein the wireless communication link establishment is incorporated with an indication that a machine-readable object associated with the wireless communication device was read, and wherein initiating wireless communication link establishment with the wireless communication device comprises selecting the certain wireless communication protocol corresponding to the received device identifier,
   wherein the machine-readable object is at least one of a radio-frequency identification (RFID) tag, a near field communication (NFC) tag, a magnetically coupled device and an image that contains the information encoded.

17. A computer program product comprising computer executable program code recorded on a computer readable non-transitory storage medium, the computer executable program code comprising:
   code for receiving a connection establishment initiation from a wireless communication device;
   code for determining whether the connection establishment initiation includes an indication that an associated machine-readable object was read by the wireless communication device,
   wherein reading of the machine readable object provides the wireless communication device with information comprising at least an apparatus identifier for connecting with the apparatus over a selected certain communication protocol corresponding to the apparatus identifier, and
   wherein the machine-readable object is at least one of a radio-frequency identification (RFID) tag, a near field communication (NFC) tag, a magnetically coupled device and an image that contains the information encoded; and
   code for participating in the wireless connection establishment and performing an associated action in response to determination that an associated machine-readable object was read by the wireless communication device initiating the connection establishment.

* * * * *